Figure 1:
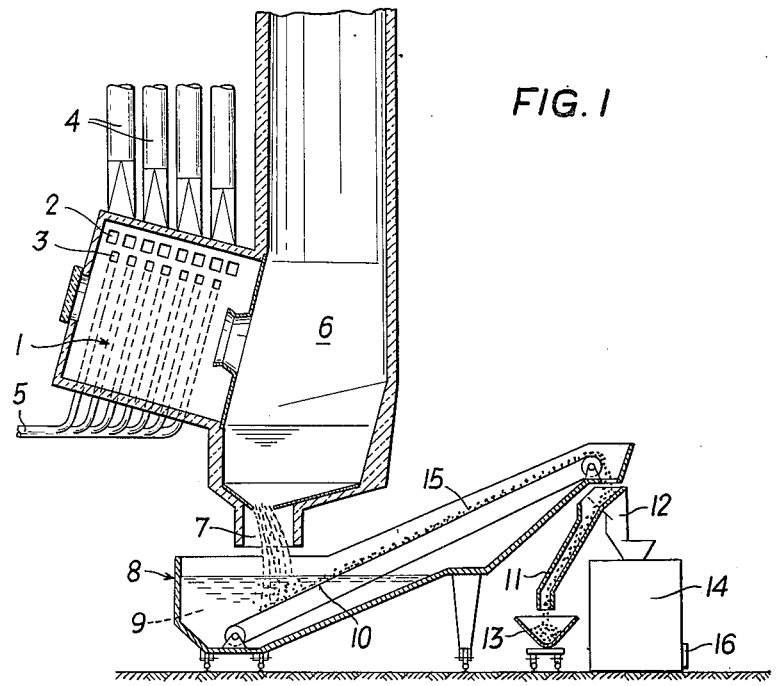

United States Patent [19]

Ott et al.

[11] 3,957,528

[45] May 18, 1976

[54] PROCESS FOR THE PRODUCTION OF AGGREGATES FOR CONCRETE BY UTILIZATION OF THE RESIDUES FROM THE COMBUSTION OF PREDOMINANTLY ORGANIC MATERIAL

[75] Inventors: Karl Ott; Paul Maydl, both of Linz, Austria

[73] Assignee: Etablissement Thermocrete Baupatente Verwertungsgesellschaft, Vaduz, Liechtenstein

[22] Filed: Mar. 29, 1973

[21] Appl. No.: 345,947

[30] Foreign Application Priority Data
Mar. 30, 1972 Austria .............................. 2772/72
Mar. 30, 1972 Austria .............................. 2771/72
Nov. 9, 1972 Germany............................ 2254750

[52] U.S. Cl................................ 106/309; 106/40 V; 106/288 B; 106/DIG. 1; 241/3
[51] Int. Cl.² ............................................. C09C 1/00
[58] Field of Search................ 106/309, 117, 40 V, 106/288 B, DIG. 1; 241/3

[56] References Cited
UNITED STATES PATENTS
2,948,948  8/1960  Duplin, Jr. et al............. 106/DIG. 1
3,030,222  4/1962  Eichenlaub........................ 106/309

Primary Examiner—Winston A. Douglas
Assistant Examiner—J. V. Howard
Attorney, Agent, or Firm—Beveridge, DeGrandi, Kline & Lunsford

[57] ABSTRACT

A process for the production of the aggregates for concrete by utilization of the residues from the combustion of predominantly organic material comprising the steps of burning said material, melting the non-combustible residues of said material, chilling the melting material by means of a cooling medium so that a vitreous granulated material is obtained, collecting said granulated material and crushing said granulated material.

8 Claims, 4 Drawing Figures

PROCESS FOR THE PRODUCTION OF AGGREGATES FOR CONCRETE BY UTILIZATION OF THE RESIDUES FROM THE COMBUSTION OF PREDOMINANTLY ORGANIC MATERIAL

The invention relates to a process for the production of aggregates for concrete by utilization of the residues from the combustion of predominantly organic material. Such residues are e.g. slags of waste material or refuse, and flue ash.

The disposal of waste accruing in densely populated areas has become a problem of increasing significance. Space to dump waste on has become scarce. Garbage disposal in the ocean will soon be eliminated, as the pollution of sea water has even today reached a dangerous level. For these reasons and since the destruction of the landscape and the pollution of subsoil water by disposed waste can no longer be tolerated, a growing number of waste incinerator plants has been built.

In order to reduce the operating costs of the garbage incinerator plant and to save space for storage of the residue from garbage incineration, attempts are being made to find some sort of use for the residues of waste incineration. But waste slags and waste ashes are not uniform in substance and not suited for further processing without supplementary treatment.

It has been suggested to dress the waste slag accruing in garbage incineration by sintering and to use the sintered slag as building material. The sintered waste slag has a coarsely porous surface and is of the most diverse grain formation, it also contains many components which are detrimental to concrete, such as, for instance, cullet. In addition, the composition of the waste slag, depending upon the garbage differing according to the time of the year, is subject to major fluctuations. The use of such sintered garbage slags as an aggregate for concrete is thus highly problematic, since this type of aggregate must meet certain requirements as far as strength and grain properties are concerned which are not given in the type of dressing previously mentioned. The sintered garbage slag can thus be used as a aggregate for the production of inferior concrete at best.

It is further known to carry out incineration of the waste at such high temperatures that the non-combustible components of the waste material are melted down. The melt is tapped and solidified in molds to pigs; the pigs are usually stored. Although it has been suggested to use the melt slags as road building material or as an aggregate for concrete, this has not proved practical. The melt slag formed in a slow cooling process is of mainly crystalline properties and thus totally unsuited as road building material, let alone as an aggregate for concrete.

It is the object of the present invention to avoid these disadvantages and to provide a process for the production of aggregates for concrete or mortar by utilization of the residues from the combustion of predominantly organic material e.g. waste material, refuse, mud or the like and/or fuel which process secures the aggregate having the properties required in a high-class concrete or mortar, in particular for weight-bearing building elements. For this process in general the residues are in form of slags of waste material or in form of flue ash.

According to the invention, a process for the production of aggregates for concrete is provided which comprises the steps of melting the residues from the combustion of predominantly organic material, chilling the melting material by means of a cooling medium so that a vitreous granulated material is obtained, collecting said granulated material and crushing said granulated material to such an extent that the particles have a maximum size of 0.125 to 0.275 inches and the fraction of particles with a grain size smaller than 0.0025 inches is 0 to 25 percent, the fraction of particles with a grain size smaller than 0.008 inches is 5 to 40 percent and the fraction of particles with a grain size of 0.008 to 0.040 inches is 30 to 60 percent of the granulated material.

By fast cooling of the molten material, a vitreous property of the granulated material and removal of most of the metal optionally contained in the melt is secured. Such metal particles can thus be separated from the vitreous granules in a simple manner, for instance by means of magnetic separation. The crushing improves the grain properties of the granules, as the larger, brittle particles are broken up and the sharp-edged surfaces of the particles are rounded off. The granulated material thus crushed is of high core strength as compared to the product immediately after the quenching process. The crushing step is particularly performed in a roller mill by a single transfer through said mill. The aggregate so obtained can be used together with organic or inorganic binders for the production of high-quality concrete. The vitreous granulated material in this also secures excellent heat insulation.

The melt, which has the form of a thin liquid, can be mixed or agitated at least immediately before quenching for example by rotational motion. This improves the structural homogeneity of the granules.

In order to adjust the desired slag composition, and to reduce the slag melting temperature, the incineration residues can be melted together with a melting agent such as quartz sand, lime or iron oxide waste; by this, the seasonal fluctuations in the composition of the waste can be balanced and a product of uniform quality can be obtained.

Suitable melting devices are furnaces for thermal power plants. Preferable are cyclone- or whirl furnaces or rotary tubular kilns. The melting point of the incineration residues, depending upon their composition, ranges between 1400° and 1800°C. Temperatures above 1800°C are also possible.

The chemical composition of the granulated material produced according to the process of the invention is generally as follows:

| | |
|---|---|
| CaO | 4 – 45 % |
| MgO | 1 – 15 % |
| FeO | 0 – 15 % |
| MnO | 0 – 3 % |
| $K_2O$ | 0 – 7 % |
| $Na_2O$ | 0 – 7 % |
| $Al_2O_3$ | 8 – 30 % |
| $Fe_2O_3$ | 0 – 20 % |
| $SiO_2$ | 25 – 70 % |
| $SO_3$ | 0 – 5 % |
| $P_2O_5$ | 0 – 2 % |
| $Ti_2O_5$ | 0 – 2 % |

The color of the granulated material mentioned above is generally darker than that of blast furance slag, but lighter than that of boiler melt slag. The melting point is approximately 1470°C.

On the basis of the chemical composition of the melting rock and slag, it is possible to calculate a characteristic value, the socalled chemical characteristic, a nondimensional quantity from which the suitability of slags for construction use can be derived to a certain degree.

The chemical characteristic is calculated on the basis of the mol share of mono-, di- and trivalent metal oxides and the oxides silicic acid, titanium dioxide, sulphur trioxide, phosphor pentoxide, further the sulfides, chlorides and fluorides according to the chemical analysis of the slags, by dividing the respective percentage share of the components by the molecular weight.

The sum of the mol percentages of the mono- and divalent ($R'_2O+R''O$) oxide is termed $a$, that of the trivalent oxides ($R'''_2O_3$) as $b$ and that of the tetravalent to hexavalent oxides and the chlorides, sulfides and fluorides is termed $c$.

Of these values, the quotients $$p = \frac{a}{c} \text{ and } q = \frac{b}{c}$$

are formulated and the chemical characteristic $C$ is calculated on the basis of the equation $$C = p + 3q$$

In a chemical characteristic of less than 0.7, there is the possibility that the required core strength is not attained. On the other hand, in a characteristic of more than 2.5, the slag might be stress-free and thus prone to bursting, aside from the hazard on instable dicalcium silicate being present.

The invention is explained in detail with reference to the accompanying drawings in which embodiments of devices for carrying out the process according to the present invention are shown diagramatically and partially as sectional views.

Figure 2:
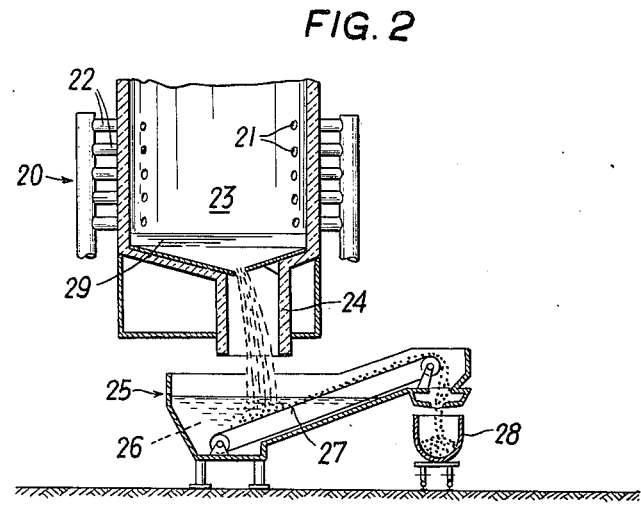
Figure 3:
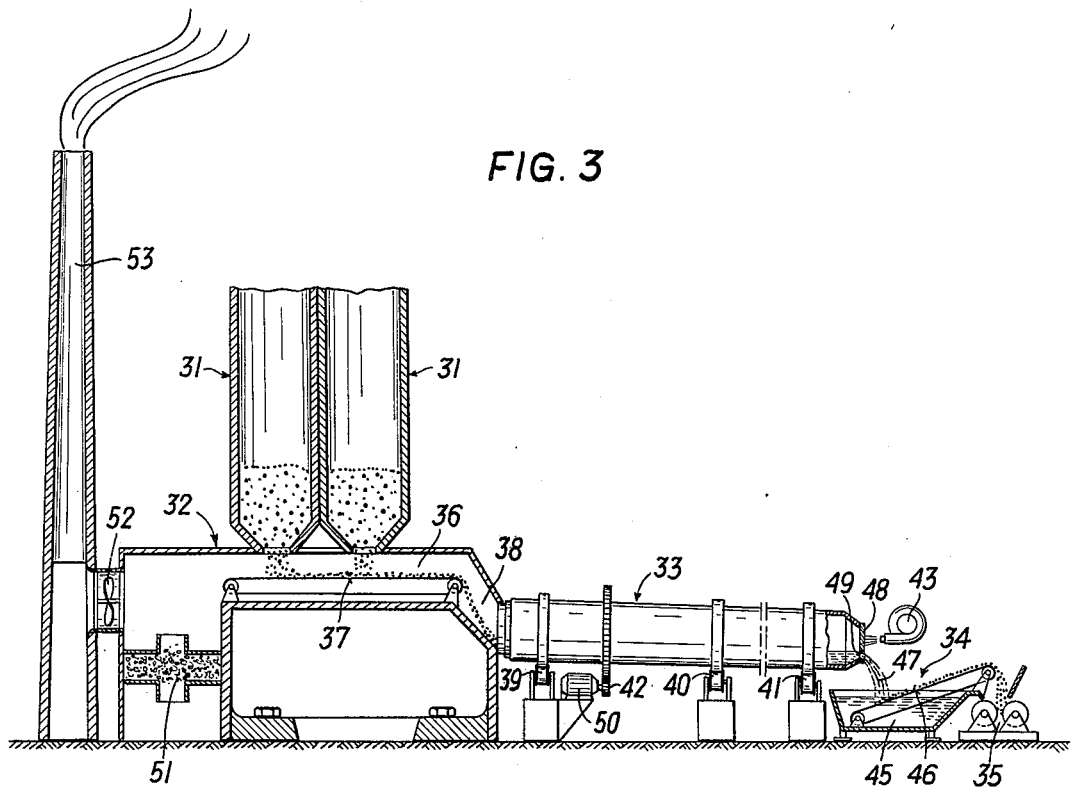
Figure 4:
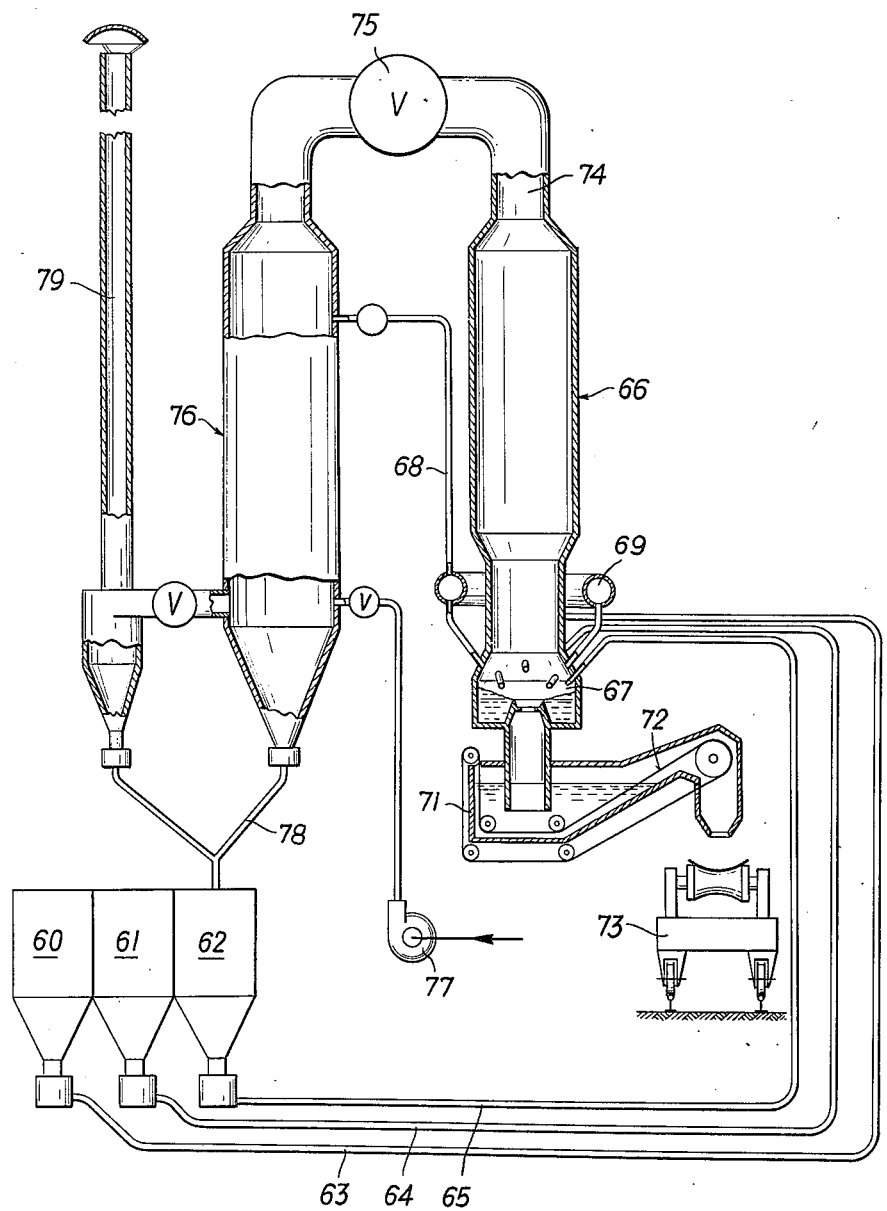

FIG. 1 is a cyclone furnace with granulating device,
FIG. 2 a whirl melt furnace with granulating device,
FIG. 3 a rotary tubular kiln provided with a granulating breaking-up device downstream and
FIG. 4 a flame incinerator.

FIG. 1 shows a cyclone furnace 1 with secant air injection. The combustion chamber of the cyclone furnace 1 is provided with inlet openings 2 for the combustion air and inlet openings 3 for coal dust and comminuted waste slag. Air supply lines 4 are connected to the openings 2 and inlet lines 5 serve for supply with coal dust and comminuted waste slag. The lower part of a waste heat boiler bears the reference number 6, this boiler is provided in its bottom with an outlet opening 7 for the liquid melt.

An advantage of cyclone incineration consists in the fact that very little solid combustion residue accrues and thus very moderately dimensioned filters for dust and ash separation are required. The solid slag or ashes accruing in waste incineration are ground for the combustion process just like coal, with the particle size optionally chosen equal to that of the coal. In many instances, grinding is not necessary, the fine ashes do not require grinding. The filter ashes (flue dust) are mixed with the coal dust after grinding and supplied together with the coal dust via lines 5 to the nozzles 3. This type of slag or ashes supply to the cyclone combustion chamber secures complete melting of the combustion residue.

The radiation- and convection part of waste heat boiler 6, just like the dust-collecting installation, are not shown in the drawing, as they are of conventional embodiments. Below the outlet opening 7 for the slag, there is a granulating device 8 provided with a water bath 9 and a conveyor belt 10 for removal of the granulated material 15 forming on introduction of the slag into the water bath 9. The granulated material can optionally be charged either via a pipe 11 or directly onto a transport means, such as a railroad car 13, or into a silo 14 by means of a hopper 12, the silo 14 being provided in its bottom with a discharge opening 16.

FIG. 2 shows an arrangement analogous to FIG. 1, but with a turbulent burner 20 also operated with coal dust instead of the cyclone furnace. The turbulent burner 20 is arranged in the lower part of a waste heat boiler and provided with nozzles 21 serving at the same time for the supply of combustion air and coal dust and combustion residue from waste incineration. The lines leading to those nozzles 21 bear the reference number 22. The reference numer 23 is used for the lower part of waste heat boiler whose upper part and the dust collecting plant are of an embodiment known per se and therefore not shown in the drawing. In the bottom 23 of the waste heat boiler there is an outlet opening 24 and below this a granulating device 25 with a water bath 26 and a conveyor belt 27. Below the discharge end of the conveyor belt, there is a transport means, for instance a railroad car 28.

The device shown in FIG. 2 is operated as follows:

The slag or ashes accruing in a garbage incinerating plant are ground up together with the fuel coal in a tube mill not represented in the drawing and the ground-up solids together with the combustion air is supplied via the lines 22 to the nozzles 21. Combustion of the coal dust or coal fines and the melting of the foreign slag as well as of the slag accruing in combustion in the combustion chamber take place simultaneously. To the mixture of fuel coal and garbage slag or ashes, the flue dust accruing in the dust collecting plant is added prior to air injection through the nozzles 21. The liquid slag 29 flows through the opening 24 into the water bath 26. The forming granulated material is charged by means of the conveyor belt 27 into the waiting railroad car.

Suitable fuels, next to coal dust, are oil or various combustible gases such a natural gas, blast furnace gas or coke gas. But the melting cyclone operated with coal dust or the turbulent burner can be replaced by an oil or gas furnace or a different type of coal furnace, for instance a step grate combustion chamber or a section combustion chamber.

The device according to FIG. 3 comprises a garbage silo 31 charged from the top and a garbage charging device 32. 33 is a rotary tubular kiln, 34 a slag granulating device and 35 a rolling crusher for comminuting the granulated material.

The garbage charging device 32 consists of a supply tunnel 36 provided with a caterpillar conveyor 37 for garbage conveying and a supply hopper 38 sealingly connected to the tunnel 36 as well as the inlet end of the rotary tubular kiln 33. The rotary tubular kiln 33 which is provided with a refractory lining of fire brick and, in the zone exposed to the most wear, of magnesite brick, is rotatably positioned at 39, 40 and 41 and operated by means of an electric motor 50 via a spurwhell drive 42. At the outlet end of the rotary tubular kiln 33, from which the liquid slag is discharged, an adjustable oil burner 43 is arranged. This oil burner supplies the ignition heat initially required for combustion and the additional heat required for the melting of the slag or ashes. The discharge end of the rotary tubular kiln 33 is closed by means of a rigidly attached lid 48 provided with openings of adjustable size which are not represented in the drawing and serve for supplying combustion air, which is conveniently preheated, for the garbage incineration. The combustion air is sucked in by the injector effect of the burner 43. The lid 48 is provided in its bottom surface with a taphole 49 for the liquid slag 47.

Below the discharge end of the rotary tubular kiln 33 there is the slag granulating device 34 consisting of a water bath 45 and a conveying device having the embodiment of a conveyor belt 46. Below the discharge end of the conveying device 46, the rolling crusher 35 which comminutes the granulated material is arranged. 51 is a filter plant, 52 an exhaust blower for the combustion gases and 53 an exhaust gas chimney.

The device according to FIG. 3 operates as follows:

The garbage, which has been freed of metal scrap by means of, for example, magnetic separation or air classification, is then charged from the silo 31 by means of a discharge device not shown in the drawing, for instance a screw conveyor, into the caterpillar conveyor 37 in the tunnel 36; the caterpillar conveyor 37 conveys the garbage from the supply hopper 38 to the inlet side of the rotary tubular kiln 33. By the inclination and the rotation of the rotary tubular kiln, the garbage is rolled forward to the discharge end of the rotary tubular kiln 33 and incinerated during this transport, the accruing ashes or slag are heated to melting temperature which depending upon the composition of the slag is 1450° to 1550°C. The heat required for the melting of the slag is supplied by the oil burner 43. The system extending from the oil burner 43 to the rotary tubular kiln 33 and the garbage charging device 32 to the flue gas chimney 49 is substantially sealed from the atmosphere so that prewarming of the garbage is already possible in the tunnel 36. The tunnel 36 is kept at slight sub pressure so that only a minor amount of air can infiltrate from the silo 31 into the tunnel 36. This allows the temperature of the garbage on being charged into the rotary tubular kiln 33 to be kept at more than 100°C, i.e. the garbage is completely dried in the tunnel 36. The waste heat from the rotary tubular kiln 33 can thus be used for preheating the garbage and for removing the moisture from same.

The combustion residue of the garbage is gradually heated and liquefied in the slag zone of the rotary tubular kiln which extends approximately over half the length of the rotary tubular kiln. The liquid slag 47 is mixed by the rotation of the rotary tubular kiln 33 and rolled on to the discharge end of the rotary tubular kiln 33 where it continuously flows through the tap hole 49 in the discharge end of the rotary tubular kiln 33 into the water bath 45; the volume of water is a multiple of the slag volume. By quenching, a vitreous granulated material is formed which is transported by means of the conveyor belt 46 from the water bath 45 and into the rolling crusher where it is broken up in one single transit to the desired grain size.

FIG. 4 shows an arrangement with incinerator. The arrangement comprises 3 containers 60, 61 and 62 for reception of crushed garbage, flue ash and coal dust, said containers being connected to the combustion zone 67 of the incinerator 66 by means of lines 63, 64, 65. The required combustion air is led to the combustion zone via lines 68, 69. In the combustion zone, the crushed garbage is burned and the non-combustible components of same and the flue ash are melted. The melt in the form of a thin liquid flows through the opening to into a tub 71 filled with water, which brings about the formation of a vitreous granulated material which is removed from the tub 71 by means of a conveyor belt 72 and dumped onto a trolley 73.

The exhaust gases of the incinerator 66 are utilized for preheating the combustion air. The exhaust gases are fed via a line 74 with a valve 75 to a heat exchanger 76 where they pass the majority of their heat to the combustion air sucked in by a pump 77. The flue ash separated from the exhaust gases is conducted via a line 78 to the container 62. The purified exhuast gases stream into the open air through a chimney 7.

EXAMPLE 1

The device according to FIG. 1 is operated at a boiler capacity of 65 MW measured at the turbine connected to the boiler. The fuel used is sea coal with a heating value (calorific value) of 6300 kcal/kg ground into dust. Maximum fuel supply is 15 t/h. The combustion air is preheated to a temperature of 420°C at the most. The air excess (ratio air to fuel) is 1 : 1 Garbage ashes or slags in a maximum amount of 2 tons per hour are supplied together with the coal dust. The melting point of the combustion residue from the garbage slag is about 1470°C. After chilling the melt about 3.1 tons per hour of granulated material are obtained. The granulated material is of the following chemical composition:

| | |
|---|---|
| CaO | 15 % |
| $Al_2O_3$ | 18 % |
| $Fe_2O_3$ | 15 % |
| $SiO_2$ | 50 % |

From these values, a chemical characteristic of 1.30 is obtained, according to the ratios indicated, for the granulated material.

The granulated material is ground in a rolling crusher in one single transit. The ground granulated material is of the following grain composition:

maximum size of the particles —0.125 to 0.275 inches
fraction of the particles with a grain size smaller than 0.0025 inches — 0 to 25 percent
fraction of the particles with a grain size of 0.008 to 0.040 inches — 30 to 60 percent.

EXAMPLE 2

As Example 1, using a melting agent such as quartz sand, lime or iron oxide waste. Due to the different composition of the garbage slag, various tests yielded results of 0.70 and 2.50 as a chemical characteristic for the granulated material. This characteristic is similar to that of blast furnace slag and the granulated material obtained from it, namely, 0.88 to 1.55, which is known as an excellent aggregate for concrete.

The granulated material is ground again, which yields the following particle size distribution: (average values taken from various samples):

maximum size of the particles — 0.125 to 0.275 inches
fraction of the particles with a grain size smaller than 0.0025 inches — 0 to 25 percent
fraction of the particles with a grain size smaller than 0.008 inches — 5 to 40 percent
fraction of the particles with a grain size of 0.008 to 0.040 inches — 30 to 60 percent of the granulated material.

EXAMPLE 3

As Example 1, but the following particle size distribution is obtained at grinding:

maximum size of the particles —0.125 to 0.275 inches
fraction of the particles with a grain size smaller than 0.0025 inches — 5 to 25 percent
fraction of the particles with a grain size smaller than 0.008 inches — 12 to 15 percent
fraction of the particles with a grain size of 0.008 to 0.040 inches — about 40 percent of the granulated material.

EXAMPLE 4

As Example 1, but the following particle size distribution is obtained at grinding:

maximum size of the particles — 0.125 to 0.275 inches
fraction of the particles with a grain size smaller than 0.0025 inches — about 5 percent
fraction of the particles with a grain size smaller than 0.008 inches — about 15 percent
fraction of the particles with a grain size of 0.008 to 0.040 inches — about 40 percent of the granulated material.

EXAMPLE 5

As Example 1, but flue ash in a quantity of 1 ton per hour being admixed with the garbage slags and fuel.

EXAMPLE 6

As Example 2, but flue ash in a quantity of 1 ton per hour being admixed with the garbage slags and fuel.

EXAMPLE 7

As Example 1, but instead of garbage slags, flue ash alone, originating from a thermal power station, is utilized in the same quantity as the garbage slags.

What we claim is:

1. A process for the production of aggregates for concrete by utilization of the residues from the combustion of predominantly organic material comprising the steps of melting said residues, chilling the melting material by means of a cooling medium so that a vitreous granulated material is obtained, collecting said granulated material and crushing said granulated material to such an extent that the particles have a maximum size of 0.125 to 0.275 inches and the fraction of particles with a grain size smaller than 0.0025 inches is 0 to 25 percent, the fraction of particles with a grain size smaller than 0.008 inches is 5 to 40 percent and the fraction of particles with a grain size of 0.008 to 0.040 inches is 30 to 60 percent of the granulated material.

2. A process for the production of aggregates for concrete by utilization of the residues from the combustion of predominantly organic waste material comprising the steps of melting the non-combustible residues of said waste material by addition of a melting agent, agitating the melting material, chilling said melting material by means of a cooling medium so that a vitreous granulated material is obtained, collecting said granulated material and crushing said granulated material by means of a roller mill to such an extent that the particles have a maximum size of 0.125 to 0.275 inches and the fraction of particles with a grain size smaller than 0.0025 inches is 5 to 25 percent, the fraction of the particles with a grain size smaller than 0.008 inches is 12 to 15 percent and the fraction of particles with a grain size of 0.008 to 0.040 inches is about 40 percent of the granulated material.

3. A process for the production of aggregates for concrete by utilization of the residues from the combustion of predominantly organic waste material comprising the steps of melting the non-combustible residues which have a melting point in the range between about 1400° and 1800°C by addition of a melting agent selected from the group consisting of quartz powder, lime and iron oxide, agitating the melting material, chilling said melting material by means of water immediately after agitating so that a vitreous granulated material is obtained, collecting said granulated material and crushing said granulated material by means of a roller mill to such an extent that the particles have a maximum size of 0.125 to 0.275 inches and the fraction of particles with a grain size smaller than 0.0025 inches is about 5 percent, the fraction of particles with a grain size smaller than 0.008 inches is about 15 percent and the fraction of particles with a grain size of 0.008 to 0.040 inches is about 40 percent of the granulated material.

4. A process for the production of aggregates for concrete by utilization of the residues from the combustion of predominantly organic waste material comprising the steps of melting the non-combustible residues of said waste material by addition of a melting agent, chilling the melting material by means of a cooling medium so that a vitreous granulated material is obtained, collecting said granulated material, delivering said granulated material to a roller mill and crushing said granulated material in a single transfer through said mill to such an extent that the particles have a maximum size of 0.125 to 0.275 inches and the fraction of particles with a grain size smaller than 0.0025 inches is 0 to 25 percent, the fraction of particles with a grain size of 0.008 to 0.040 inches is 30 to 60 percent of the granulated material.

5. A process for the production of aggregates for concrete by utilization of flue ash comprising the steps of melting said flue ash by addition of a melting agent, agitating the melting material, chilling said melting material by means of a cooling medium so that a vitreous granulated material is obtained, collecting said granulated material and crushing said granulated material by means of a roller mill to such an extent that the particles have a maximum size of 0.125 to 0.275 inches and the fraction of particles with a grain size smaller than 0.0025 inches is 5 to 25 percent, the fraction of particles with a grain size smaller than 0.008 inches is 12 to 15 percent and the fraction of particles with a grain size of 0.008 to 0.040 inches is about 40 percent of the granulated material.

6. A process for the production of aggregates for concrete by utilization of flue ash comprising the steps of melting said flue ash which has a melting point in the range between about 1400° and 1800°C by addition of a melting agent selected from the group consisting of quartz powder, lime and iron oxide, agitating the melting material. chilling said melting material by means of water immediately after agitating so that a vitreous granulated material is obtained, collecting said granulated material and crushing said granulated material by means of a roller mill to such an extent that the particles have a maximum size of 0.125 to 0.275 inches and the fraction of particles with a grain size smaller than 0.0025 inches is about 5 percent, the fraction of particles with a grain size smaller than 0.008 inches is about 15 percent and the fraction of particles with a grain size of 0.008 to 0.040 inches is about 40 percent of the granulated material.

7. A process for the production of aggregates for concrete by utilization of the residues from the combustion of predominantly organic waste material and flue ash comprising the steps of burning said waste material, melting the non-combustible residues of said waste material and said flue ash by addition of a melting agent, agitating the melting material, chilling said melting material by means of a cooling medium so that a vitreous granulated material is obtained, collecting said granulated material and crushing said granulated material by means of a roller mill to such an extent that the particles have a maximum size of 0.125 to 0.275 inches and the fraction of particles with a grain size smaller than 0.0025 inches is 5 to 25 percent, the fraction of particles with a grain size smaller than 0.008 inches is 12 to 15 percent and the fraction of particles with a grain size of 0.008 to 0.040 inches is about 40 percent of the granulated material.

8. A process for the production of aggregates for concrete by utilization of the residues from the combustion of predominantly organic waste material and flue ash comprising the steps of burning said waste material, melting the non-combustible residues and the flue ash which have a melting point in the range between about 1400° and 1800°C by addition of a melting agent selected from the group consisting of quartz powder, lime and iron oxide, agitating the melting material, chilling said melting material by means of water immediately after agitating so that a vitreous granulated material is obtained, collecting said granulated material and crushing said granulated material by means of a roller mill to such an extent that the particles have a maximum size of 0.125 to 0.275 inches and the fraction of particles with a grain size smaller than 0.0025 inches is about 5 percent, the fraction of particles with a grain size smaller than 0.008 inches is about 15 percent and the fraction of particles with a grain size of 0.008 to 0.040 inches is about 40 percent of the granulated material.

* * * * *